US009326083B2

(12) United States Patent
Fujita et al.

(10) Patent No.: US 9,326,083 B2

(45) Date of Patent: Apr. 26, 2016

(54) AUDIO SIGNAL PROCESSING SYSTEM

(71) Applicant: Yamaha Corporation, Hamamatsu-shi, Shizuoka-ken (JP)

(72) Inventors: Hiroaki Fujita, Hamamatsu (JP); Satoshi Sendoh, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 181 days.

(21) Appl. No.: 13/759,918

(22) Filed: Feb. 5, 2013

(65) Prior Publication Data

US 2013/0202133 A1 Aug. 8, 2013

(30) Foreign Application Priority Data

Feb. 8, 2012 (JP) ................................ 2012-025603

(51) Int. Cl.
*H04B 1/00* (2006.01)
*H04S 3/00* (2006.01)
*H04S 7/00* (2006.01)

(52) U.S. Cl.
CPC ... *H04S 3/00* (2013.01); *H04S 7/30* (2013.01); *H04S 2400/13* (2013.01); *H04S 2400/15* (2013.01)

(58) Field of Classification Search
USPC ................................ 381/119; 700/94; 369/4
See application file for complete search history.

(56) References Cited

U.S. PATENT DOCUMENTS

| | | | | |
|---|---|---|---|---|
| 5,915,066 | A * | 6/1999 | Katayama | 386/338 |
| 5,930,375 | A * | 7/1999 | East et al. | 381/119 |
| 2002/0015504 | A1* | 2/2002 | Kohno et al. | 381/119 |
| 2002/0065570 | A1* | 5/2002 | Fujita et al. | 700/94 |
| 2008/0065248 | A1* | 3/2008 | Araki et al. | 700/94 |
| 2008/0175414 | A1* | 7/2008 | Kageyama et al. | 381/119 |
| 2011/0317852 | A1 | 12/2011 | Kawano | |

FOREIGN PATENT DOCUMENTS

| | | | |
|---|---|---|---|
| JP | 2002-050123 | A | 2/2002 |
| JP | 2005-229589 | A | 8/2005 |
| JP | 2006-133687 | A | 5/2006 |
| JP | 2006-277829 | A | 10/2006 |
| JP | 2012-010154 | A | 1/2012 |

OTHER PUBLICATIONS

Notification of Reason(s) for Refusal dated Dec. 25, 2015, for JP Application No. 2012-25603, with English translation, six pages.

* cited by examiner

*Primary Examiner* — Vivian Chin
*Assistant Examiner* — Friedrich W Fahnert
(74) *Attorney, Agent, or Firm* — Morrison & Foerster LLP

(57) ABSTRACT

An audio signal processing system for recording a sound inputted into a channel of a mixer which receives a plurality of audio signals, processes the audio signals in a plurality of channels and outputs the processed signals, and reproducing the recorded audio signal for adjusting parameters of the mixer is provided. The audio signal processing system records, when record is instructed a channel is selected, an audio signal inputted to the selected channel with relation information indicating the selected channel, and reproduces, when reproduction is instructed and a channel is selected, an audio signal which has been stored with relation information indicating the selected channel.

5 Claims, 5 Drawing Sheets

F I G. 1
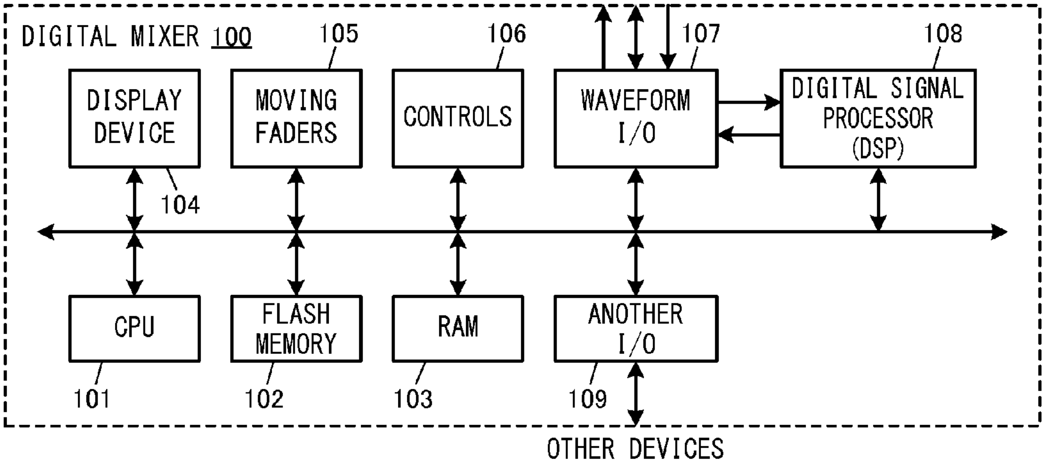
F I G. 2
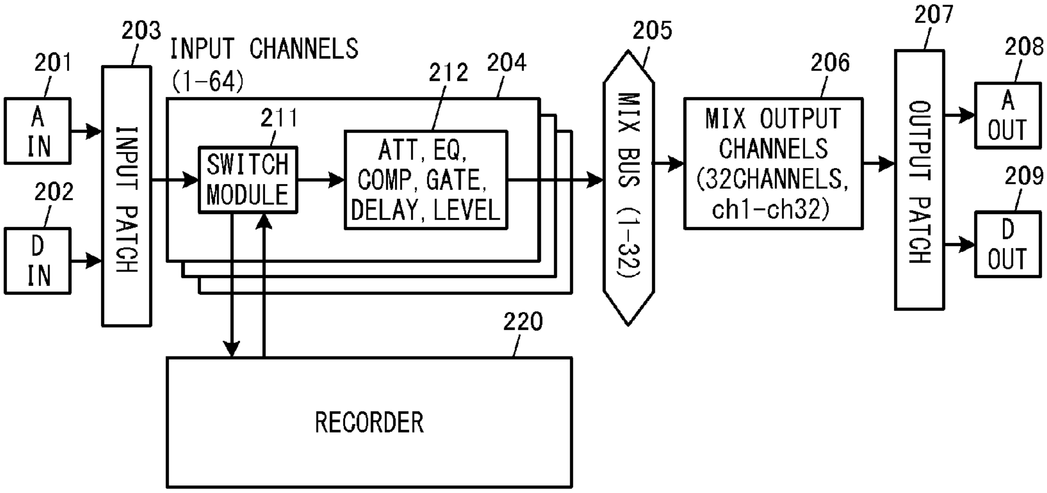
F I G. 3
| | | | |
|---|---|---|---|
| TRACK 1 | CHANNEL NUMBER | TAKE NUMBER | AUDIO SIGNAL |
| TRACK 2 | CHANNEL NUMBER | TAKE NUMBER | AUDIO SIGNAL |
| TRACK 3 | CHANNEL NUMBER | TAKE NUMBER | AUDIO SIGNAL |
| ⋮ | ⋮ | ⋮ | ⋮ |
| TRACK x | CHANNEL NUMBER | TAKE NUMBER | AUDIO SIGNAL |

AUDIO SIGNAL PROCESSING SYSTEM

BACKGROUND OF THE INVENTION

1. Field of the Invention

The invention relates to an audio signal processing system and storage medium for enabling easier sound check in a digital mixer that intensely controls acoustic facilities at halls where concerts and theaters are held.

2. Description of the Related Art

Conventionally, digital mixers controlling acoustic facilities at halls where concerts and theaters are held have been known. In the acoustic facilities at halls, many microphones and many speakers are used and wide variety of effect sounds are also used. The digital mixer centrally controls how to mix many input signals, how to add effects to the mixed signals, to which output system to output the signals, and so on.

In the mixer, sound check is sometimes performed for parameter adjustment before a real stage of a concert or the like. The sound check means a work of adjusting various parameter values (values of parameters such as COMP and EQ) of the mixer before a real stage. Generally, an operator adjusts the various parameter values of the mixer using, as sample sounds, sounds which are obtained by play of instruments and singing of vocalists in rehearsal. The sound check is work which is desired to be necessarily performed before every real stage in order to set the parameter values according to an environment of the day such as temperature, humidity, and states of instruments and vocalists. However, in the sound check, the operator should adjust parameter values for each microphone and instrument (for each channel) of all channels and therefore it takes a lot of trouble. In addition, players and staffs are busy before a real stage, and it is sometimes impossible to perform rehearsal for enough time to adjust all of the parameter values.

Under the above circumstances, generally, sounds played at rehearsal are recorded in a recorder and values of parameters which could not be adjusted during the rehearsal are adjusted after the rehearsal using the recorded sounds as sample sounds. An apparatus described in the following Document 1 can be used for such sound check. This apparatus can record sounds of respective channels, mix buses and a stereo bus in arbitrary tracks of a recorder, reproduce the recorded sounds, and input the reproduced sounds into arbitrary channels. A user manually sets to which channel the reproduced sound is inputted. This system is rich in diversity of configuration because of use of an external recorder. However, this system has a lot of trouble with connection between the mixer and the recorder and connection between the track and the channel with the possibility of improper connection.

On the other hand, there is an apparatus which has an internal recorder provided for each channel and can record and reproduce sounds for each channel, as described in the following Document 2. This apparatus does not require work of connecting the mixer and the recorder and connecting the track and the channel without the possibility of improper connection. However, the apparatus has a predetermined capacity of memory area for each channel in a fixed manner, and therefore has poor use efficiency of memory. That is, memory area may run out at recording in one channel and on the other hand prepared memory capacity may be too much for another channel even though the channel requires only a small capacity.

Document 1: JP 2002-50123 A

Document 2: JP 2005-229589 A

SUMMARY OF THE INVENTION

In the case of performing the above sound check, users desire simpler setting operation of connection between the track and a recording channel and setting of connection between the track and a reproduction channel. Accordingly, it is desired that at sound check, the connection setting can be performed rapidly, accurately and easily. In the case of employing a method of providing an internal or external recorder and recording sample sounds for sound check, there also is a desire to distribute limited capacity of a memory for recording only to necessary tracks (channels) for efficient use of the memory.

An object of the invention is to provide an audio signal processing system and storage medium in which sound check can be performed more rapidly, accurately and easily than before and a memory for recording sample sounds can be efficiently used.

To attain the object, the present invention provides an audio signal processing system for recording a sound inputted into a channel of a mixer which receives a plurality of audio signals, processes the audio signals in a plurality of channels and outputs the processed signals, and reproducing the recorded sound for adjusting parameters of the mixer, including: a record instructor that instructs to record; a reproduction instructor that instructs to reproduce; a channel selector that selects a channel as a target; a recorder that, when the record instructor instructs to record and the channel selector selects a first channel, records an audio signal inputted to the selected first channel with relation information indicating the selected first channel; a reproducer that, when the reproduction instructor instructs to reproduce and the channel selector selects a second channel, reproduces an audio signal which has been stored with relation information indicating the selected second channel, and sends the reproduced audio signal to the selected second channel.

In such an audio signal processing system, it is conceivable that the recorder records audio signals of a plurality of takes regarding one channel with take information indicating the take of the respective recorded audio signals.

Further, it is conceivable that the audio signal processing system further includes a take selector that selects a take to be reproduced, and the reproducer reproduces an audio signal of the selected take among the audio signals which has been stored with the relation information indicating the selected second channel.

Further, the invention also provides a non-transitory computer readable storage medium that stores program instructions for instructing a processor of a mixer, which receives a plurality of audio signals, processes the audio signals in a plurality of channels and outputs the processed signals, to record a sound inputted into a channel of the mixer and reproduce the recorded sound for adjusting parameters of the mixer, the program instructions causing the processor to execute: a step of accepting an instruction to record; a step of accepting an instruction to reproduce; a step of accepting selection of a channel as a target; a step of, when the instruction to record is accepted and the selection of a first channel is accepted, recording an audio signal inputted to the selected first channel with relation information indicating the selected first channel; a step of, when the instruction to reproduce is accepted and the selection of a second channel is accepted, reproducing an audio signal which has been stored with relation information indicating the selected second channel, and sending the reproduced audio signal to the selected second channel.

The above and other objects, features and advantages of the invention will be apparent from the following detailed description which is to be read in conjunction with the accompanying drawings.

BRIEF DESCRIPTION OF THE DRAWINGS

FIG. 1 is a hardware configuration diagram of a digital mixer being one embodiment to which the invention is applied;

FIG. 2 is a block diagram of audio signal processing by the digital mixer;

FIG. 3 is a chart illustrating a recording format of audio signals;

DETAILED DESCRIPTION OF THE PREFERRED EMBODIMENTS

Figure 4:
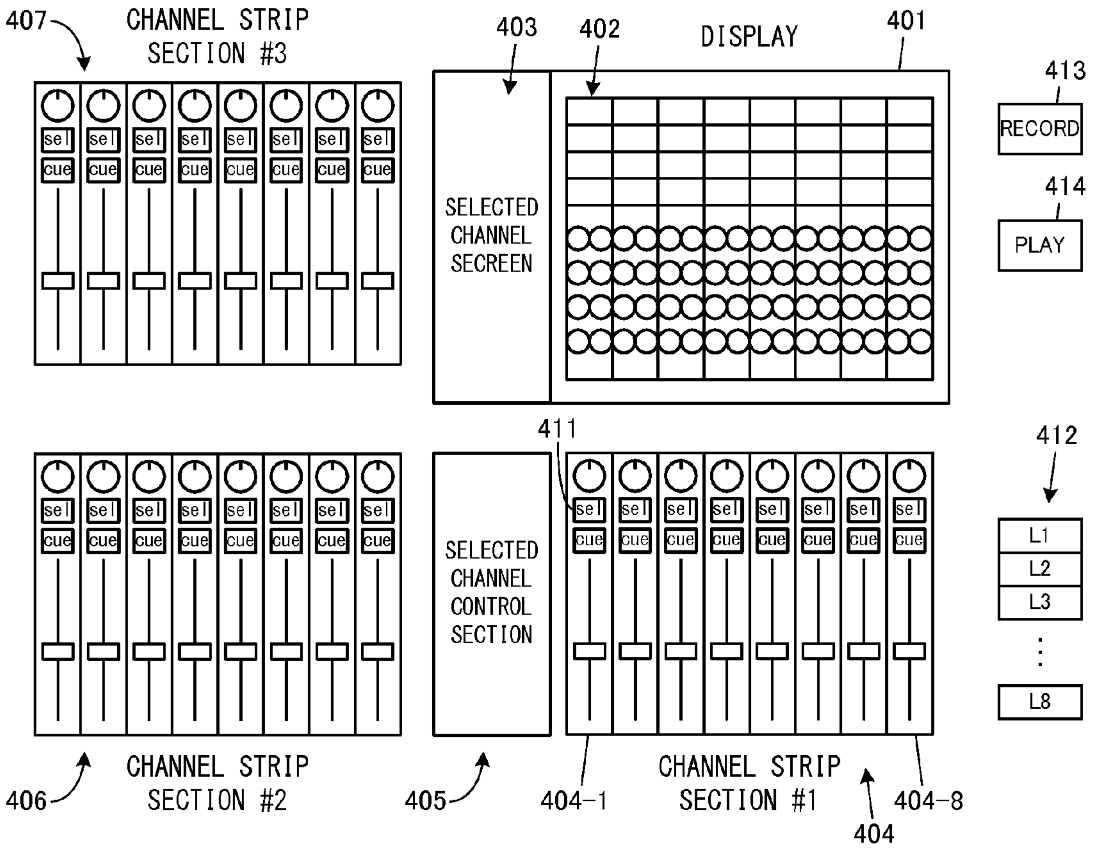
FIG. 4 is an external appearance of a panel of the digital mixer.

Hereinafter, an embodiment of the invention will be described using the drawings.

FIG. 1 illustrates hardware configuration of a digital mixer 100 being one embodiment in which the invention is applied as a sound check system. This digital mixer 100 is an audio signal processing system. A central processing unit (CPU) 101 is a processor that controls operation of the whole mixer. A flash memory 102 is a non-volatile memory that stores various programs executed by the CPU 101 and various kinds of data. A random access memory (RAM) 103 is a volatile memory that is used for a load area and a work area for the programs executed by the CPU 101. A display device 104 is a touch panel type display for displaying various kinds of information, which is provided on a console of the mixer and can detect a touch operation thereon. Moving faders 105 are controls for level setting provided on the console. Controls 106 are various kinds of controls (other than the moving faders) operated by a user, which are provided on the console. A waveform input/output interface (waveform I/O) 107 is an interface for transmitting audio signals to and/or receiving audio signals from external devices. A digital signal processor (DSP) 108 executes various kinds of micro programs according to instructions of the CPU 101 to perform mixing processing, effect application processing, sound volume level control processing, and the like on audio signals inputted via the audio I/O 107, and outputs the processed audio signals via the waveform I/O 107. Another I/O 109 is an interface for connecting with other devices. A bus 110 is a bus line that connects the above units and is a general name of a control bus, a data bus, and an address bus.

Though not illustrated in FIG. 1, an external recorder is connected to the digital mixer 100 via the other I/O 109 and the waveform I/O 107. The digital mixer 100 can provide an instruction (command) via the other I/O 109 to control operation of the external recorder. For instance, provision of an instruction to record causes the external recorder to record (store) an audio signal inputted from the mixer via the waveform I/O 107 with instructed information. Further, provision of an instruction to reproduce causes the external recorder to read instructed audio signal from the recorded data and output the read audio signal to the mixer via the waveform I/O 107, thereby reproducing the recorded audio signal. Note that the "audio signals" in this specification are not limited to human voice but include instrumental sounds and any other audio signals.

FIG. 2 is a block diagram illustrating functional configuration of audio signal processing realized by the digital mixer 100 in FIG. 1. A reference sign 220 denotes the external recorder which is not illustrated in FIG. 1.

A reference sign 201 denotes an input module that receives analog audio signals inputted via a microphone or the like after converting the signals into digital signals. A reference sign 202 denotes an input module for digital audio signals. A plurality of lines inputs of audio signals (the number of lines has an upper limit depending on the apparatus configuration) can be provided using these input modules. An input patch 203 optionally connects the aforementioned inputs to input channels 204. The user can arbitrarily set connections of the input patch while looking at a predetermined screen. As the input channels 204, 64 single channels are provided.

Each channel of the input channels 204 includes a switch module 211 and a signal processor 212. The switch module 211 switches, according to instruction by the CPU 101, connections of signal transmission paths regarding signal transmission of an audio signal inputted to the input channel to the recorder 220 or the signal processor 212, or signal transmission of an audio signal outputted from the recorder to the signal processor, or the like. The switching function of the switch module 211 will be described in detail in FIG. 5.

The signal processor 212 performs various kinds of signal processing such as level control and frequency characteristic adjustment on the input signal based on values of parameters set by the CPU 101. Signal in each input channel 204 can be selectively outputted to 32 lines of MIX buses 205, and its send level can be independently set for each line. Each line of the 32 MIX buses 205 mixes the signals inputted from each channel of the input channels 204. The signal obtained by the mixing is outputted to an output channel corresponding to the MIX bus among output channels 206 (1st to 32nd channels). Each channel of the output channels 206 is corresponded to each line of the MIX buss 205 on one-to-one basis. Each output channel performs various kinds of signal processing on output side based on values of parameters set of the CPU 101. Output from the output channel 206 is inputted into an output patch 207. The output patch 207 optionally connects the output channels 206 to an analog output module 208 or a digital output module 209. The user can arbitrarily set connections of the output patch while looking at a predetermined screen.

Note that the input modules 201, 202 and the output modules 208, 209 are realized by the waveform I/O 107 in FIG. 1. The other modules 203 to 207 are realized by executing predetermined micro programs by the DSP 108. The micro programs are sent from the CPU 101 to the DSP 108 and set in the DSP 108. Coefficient data used when the DSP 108 executes the micro programs is also sent from the CPU 101 to the DSP 108 and set in the DSP 108.

Hereinafter, reference numerals 204 to 206 are used to indicate also one channel or one line among the input channels 204 or so.

The digital mixer 100 can rapidly, accurately and easily record and reproduce a sample sound for sound check for each channel. The operation method for them will be described later in FIG. 3, in which when it is instructed to record for one input channel 204, the digital mixer 100 outputs an audio signal immediately after being inputted into the one input channel 204 (an audio signal before exposed to signal processing in the input channel 204) from the switch module 211 to the recorder 220, and the recorder records the audio signal. When it is instructed to reproduce for one input channel, the recorder 220 reproduces the audio signal recorded regarding the one input channel and inputs the reproduced audio signal to a point in the switch module 211 of the one input channel 204 that is the same point as the recording point (a place from which the recorded audio signal has been taken out at the time of recording).

FIG. 3 illustrates a recording format of audio signals of the sample sounds for sound check recorded in the recorder 220. The recorder 220 records an audio signal which is sent from the switch module 211 of an arbitrary input channel 204, in a format with which a channel number of the input channel and a take number can be specified. The channel number is relation information indicating the recording source channel (from which channel the audio signal is recorded), and is not necessarily a number. The take number is take information, and is a number indicating what number take in the same channel (indicating what number recording in the recording source channel) the sample sound is, and is not necessarily a number as long as the take can be identified. One channel number and one take number and an audio signal inputted from the channel in the take are recorded in one unit, and the one unit is called a track in this embodiment. One track corresponds to one-time recording (reproduction). The time length of the audio signal of one track, namely, one-time recording (reproduction) is set to several tens of seconds here. This is because several tens of seconds are enough for the sample sound for sound check. On the other hand, such a sample sound is desired on-site to be recorded in a plurality of takes for one channel so that one of the takes is selected for reproduction, and therefore the recorder 220 is configured to be capable of recording a plurality of takes for one channel. The take number is unique in the channel. Namely, a plurality of tracks having the same channel number are necessarily different in take number. One take number is recorded only in one track. A plurality of take numbers are not recorded in one track, but the area for the take number may be eliminated to omit take information, or 0 or null may be stored in the area for the take number. In the case of eliminating the take information or storing 0 or null in the area for the take number, the audio signal in the track means the only one audio signal recorded for the channel indicated by the channel number.

Note that an arbitrary area can be used for recording the sample sounds for sound check in the recorder 220, and the area may be fixed or variable. The recording capacity of one track is also arbitrary and may be fixed or variable. In the case of record in the format of FIG. 3, total number of tracks is also arbitrary and may be fixed or variable. The number of takes recordable per channel is also arbitrary. Number of takes in one channel may be fixed to the same number for all of the channels or to a different number for each channel. It is also adoptable that number of takes is not fixed at all.

FIG. 4 is (a part of) an external appearance of the console of the digital mixer 100 in this embodiment. A reference sign 401 denotes a display (104 in FIG. 4) that displays various kinds of information. On the lower side of the display 401, a channel strip section 404 (105, 106 in FIG. 1) is provided. The channel strip section 404 is composed of eight channel strips 404-1 to 404-8. One channel strip, for example, 404-1 includes controls such as a rotary encoder, a moving fader and various switches and, in particular, includes a selection (SEL) switch 411. A reference sign 412 denotes eight layer switches. The 64 input channels 204 are divided into eight layers such that the first to eighth channels are included in a first layer, the ninth to 16-th channels are included in a second layer, and so on. When one of the layers is selected by the layer switch 412, the eight input channels in that layer are allocated to the channel strips 404-1 to 404-8 in order. Then, by operating the controls of any of the channel strips 404-1 to 404-8, parameters of the input channel allocated to the operated channel strip can be adjusted. Channel strip sections 406, 407 are also composed of the same eight channel strips as those of the channel strip section 404. The channel strip sections 406, 407 are channel strip sections to which channels are fixedly allocated in advance.

In an area 402 inside the display 401 on the upper side of the channel strip section 404, display areas for a plurality of parameters (channel parameter display areas) of the channels allocated to the respective channel strips are arranged and displayed at positions corresponding to the upper parts of the channel strips 404-1 to 404-8 of the channel strip section 404. The same number of (eight, here) channel parameter display areas as the number of the channel strips provided in the channel strip section 404 are displayed. The channel parameter display areas realize parameter display functions for displaying values of various parameters in the allocated channel.

In a display area on the left side of the display 401, a selected channel screen 403 is displayed. The selected channel screen 403 is an area where various parameters relating to one selected channel (selected channel) are displayed. Values of the parameters of the selected channel displayed in the selected channel screen 403 can be adjusted by the controls arranged in a selected channel control section 405. The selected channel is designated by turning on the SEL switch 411 of the channel strip. The channel allocated to the channel strip whose SEL switch 411 is turned ON becomes the selected channel. In the digital mixer 10 of this embodiment, the selected channel is exclusive and therefore only one selected channel exists at all times. Accordingly, in the state that the SEL switch of one channel strip is ON and the channel allocated to the channel strip is the selected channel, when the SEL switch of another channel strip is turned on, the channel allocated to the channel strip whose SEL switch is newly turned on newly becomes the selected channel, whereas the channel which has been the selected channel before becomes no longer the selected channel. Along with this, the selected channel screen 403 is switched to a screen for the new selected channel, and the control target of the selected channel control section 405 is also switched to the new selected channel.

A reference sign 413 denotes a recording switch for instructing to record a sample sound for sound check. The recording switch 413 is a switch that switches by a toggle between start and stop of recording every time it is depressed. Internally, one recording flag is provided for the whole mixer (not for each channel). The recording flag in ON state indicates a state that recording is being performed and the recording flag in OFF state indicates a state that recording is stopped. In the initial state immediately after the digital mixer 100 is turned on, the recording flag is OFF. When the recording switch 413 is depressed with the recording flag being OFF, the recording flag is turned ON and the recorder 220 starts to record an audio signal inputted in the selected channel at that point in time. Then, when the recording switch 413 is depressed again, the recording flag is turned OFF, and the recorder 220 stops the recording. When the selected channel is switched by the SEL switch with the recording flag being ON, the recording flag is kept ON, and the recording of the channel which has been the selected channel before the switching is stopped, and recording of the audio signal inputted to the channel which newly becomes the selected channel is started.

A reference sign 414 denotes a reproduction switch for instructing to reproduce a sample sound for sound check. The reproduction switch 414 is a switch that switches by a toggle between start and stop of reproduction every time it is depressed. Internally, one reproduction flag is provided for the whole mixer (not for each channel). The reproduction flag in ON state indicates a state that reproduction is being performed and the reproduction flag in OFF state indicates a state that reproduction is stopped. In the initial state immediately after the mixer is turned on, the reproduction flag is OFF. When the reproduction switch 414 is depressed with the reproduction flag being OFF after the sample sound in each channel is recorded using the above-described recording function, the reproduction flag is turned ON and reproduction of the audio signal which has been recorded regarding the selected channel at that point in time is started. Then, when the reproduction switch 414 is depressed again, the reproduction flag is turned OFF, and the reproduction is stopped. When the selected channel is switched by the SEL switch with the reproduction flag being ON, the reproduction flag is kept ON, and the reproduction regarding the channel which has been the selected channel before the switching is stopped, and reproduction of the audio signal which has been recorded regarding the channel which newly becomes the selected channel is started.

Figure 5:
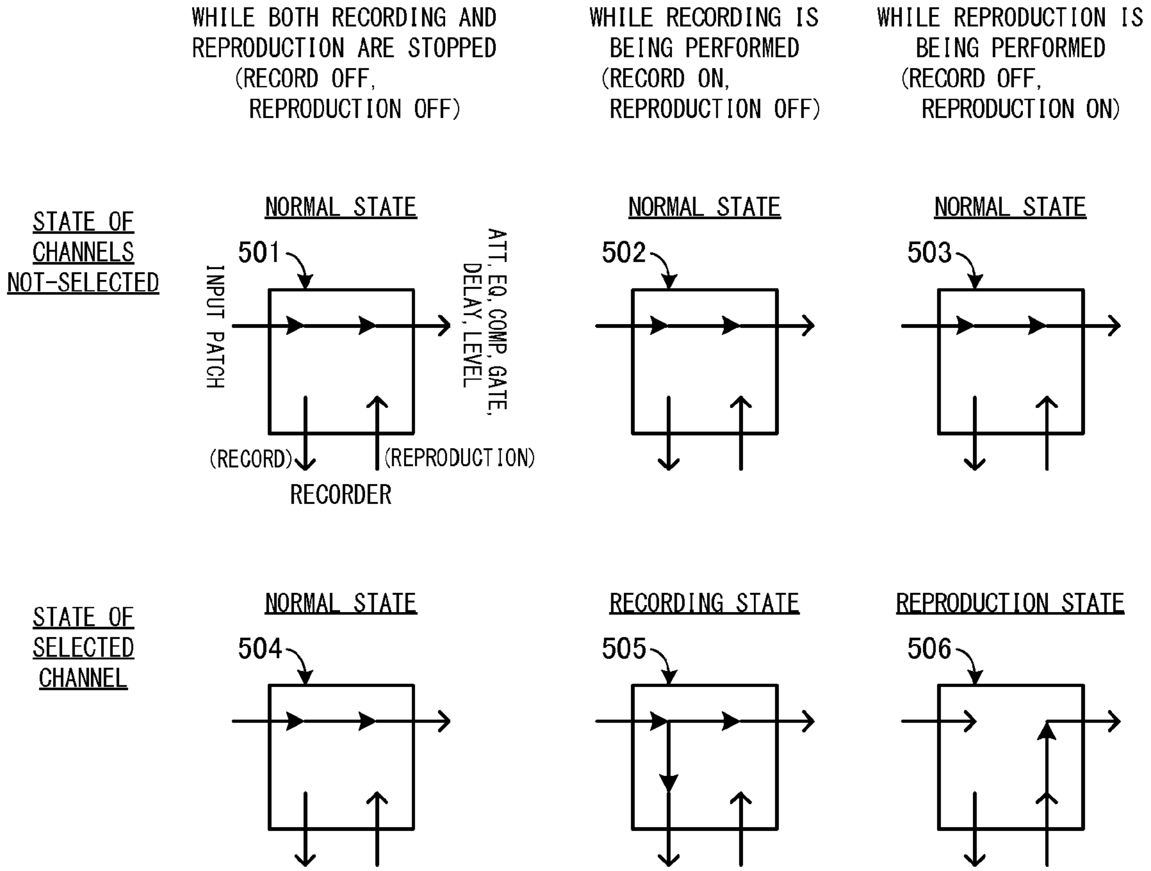
FIG. 5 is a block diagram illustrating details of function of a switch module.

FIG. 5 is a block diagram illustrating details of functions of the switch module 211. The switch module 211 of each channel takes any of "normal state," "recording state," and "reproduction state" according to instruction from the CPU 101.

The "normal state" is a connection state in which the switch module 211 passes the audio signal inputted from the input patch 203 into the input channel to the processor 212 as it is. There is no transmission and reception of audio signals between the switch module 211 and the recorder 220. The switch module 211 in each of the cases illustrated at 501 to 504 is set in the normal state, the cases being namely each of (1) the switch module 211 of each channel which is not selected while both recording and reproduction are stopped (the recording flag being OFF and the reproduction flag being OFF), (2) the switch module 211 of each channel which is not selected while recording is being performed (the recording flag being ON and the reproduction flag being OFF), (3) the switch module 211 of each channel which is not selected while reproduction is being performed (the recording flag being OFF and the reproduction flag being ON), and (4) the switch module 211 of the selected channel while both recording and reproduction are stopped (the recording flag being OFF and the reproduction flag being OFF).

The "recording state" is a connection state in which the switch module 211 passes the audio signal inputted from the input patch 203 into the input channel to both the processor 212 and the recorder 220. The switch module 211 of the channel in a case illustrated at 505 takes the recording state, the case being namely the switch module 211 of the selected channel while recording is being performed (the recording flag being ON and the reproduction flag being OFF).

The "reproduction state" is a connection state in which the switch module 211 discards the audio signal inputted from the input patch 203 into the input channel (without passing to the processor 212 or the recorder 220), and passes the audio signal reproduced and outputted from the recorder 220 to the processor 212. The switch module 211 of the channel in a case illustrated at 506 takes the reproduction state, the case being namely the switch module 211 of the selected channel while reproduction is being performed (the recording flag being OFF and the reproduction flag being ON).

Note that, although each channel which is not selected while reproduction is being performed is in the normal state here as illustrated at 503, the reproduction means that the sample sound is being reproduced for the selected channel and the parameters of the channel are being adjusted. Therefore, the channel which is not selected may be set such that the audio signal from the input patch 203 is not passed to the processor 212.

Figure 6:
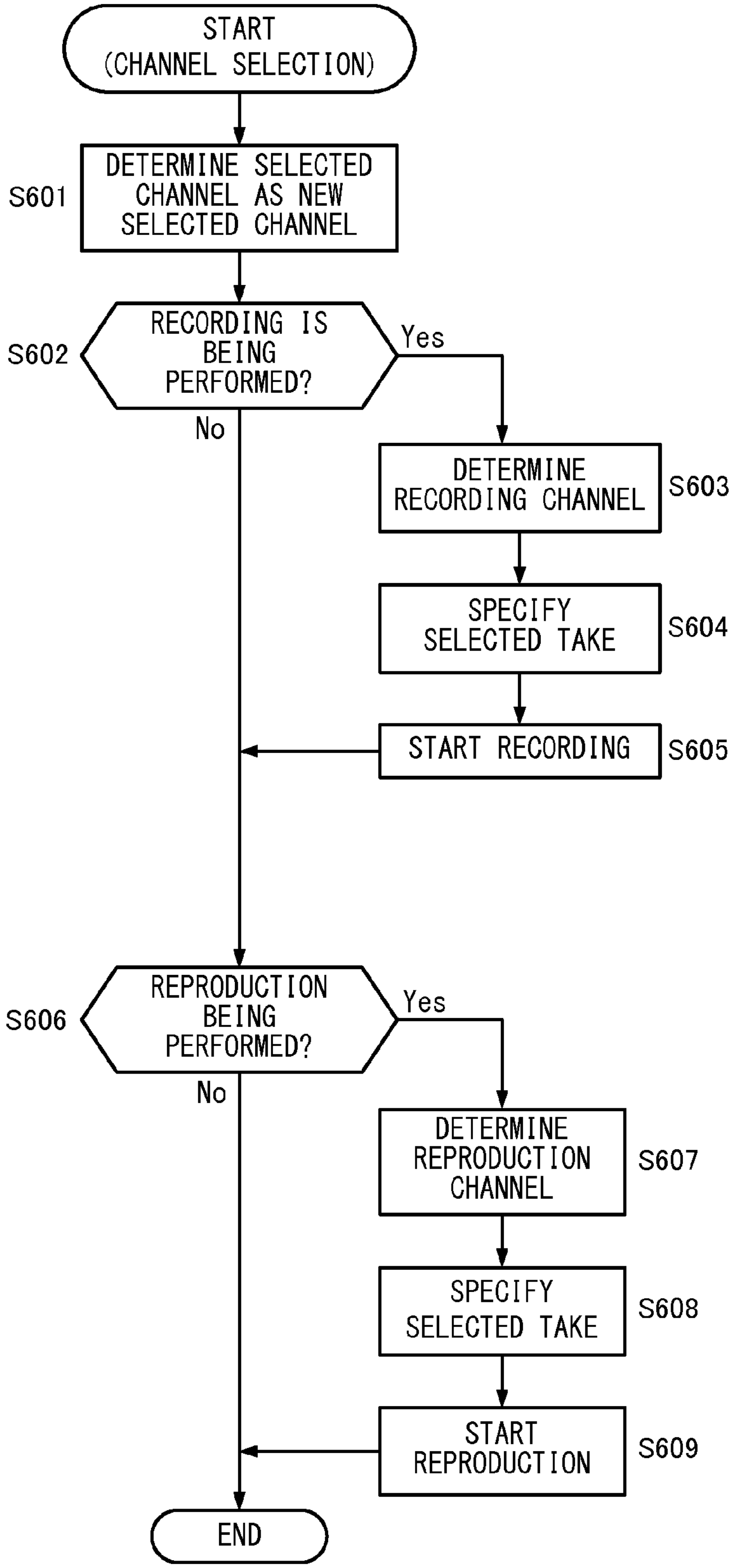
FIG. 6 is a flowchart of channel selecting processing.

FIG. 6 illustrates a flowchart of channel selecting processing executed by the CPU 101. When an instruction to change the selected channel (when an instruction to newly select a channel is accepted), namely, when the SEL switch 411 of any of the channel strips on the console is depressed in this embodiment, the CPU 101 starts the processing in FIG. 6 regarding the channel allocated to the channel strip having the depressed SEL switch.

At step S601, the CPU 101 determines the newly selected channel as the selected channel. The selected channel has been already described with the SEL switch 411 in FIG. 4. The switch module 211 of the channel which has been the selected channel before is returned to the normal state. If recording or reproduction is being performed, it is stopped (the channel is released from a recording channel or a reproduction channel). Further, in place of the previous selected channel, the CPU 101 allocates the new selected channel to the selected channel control section 405. The CPU 101 updates control target of the selected channel control section 405 and display of the selected channel screen 403 according to the new selected channel.

Then, at step S602, the CPU 101 determines whether or not recording is being performed. This is processing of checking the recording flag and determining that recording is being performed when the recording flag is ON and determining that recording is stopped when the recording flag is OFF. If recording is stopped, the processing is proceeded to step S606. If recording is being performed, the CPU 101 performs steps S603 to S605 as processing when a recording channel is newly selected. First, at step S603, the CPU 101 determines the new selected channel as the recording channel. Note that the channel during recording is called a recording channel. In this embodiment, in the case where recording is being performed, the selected channel and the recording channel are the same channel at all times. The CPU changes the switch module 211 of the recording channel to the recording state described in FIG. 5. At step S604, the CPU 101 specifies a selected take. Only one track is the recording target regarding one channel at a time. In this processing, one take is specified as the selected take (newly selected take). Specifically, the CPU 101 specifies the newly selected take referring to all recorded data in FIG. 3 which has been already recorded with the channel number of the recording channel. In other words, the CPU 101 decides a take number other than existing take numbers of the recorded data which has been already recorded with the channel number of the recording channel as the new take number. For example, take numbers are given in order from 1.

Next, at step S605, the CPU 101 starts recording. Here, the CPU 101 instructs the recorder 220 to reserve a memory area for storing the audio signal and start recording the audio signal by giving the recorder 220 channel information of the recording channel determined at step S603 and take information specified at step S604. Then, when accepting the instruction to start the recording, the recorder 220 reserves a new track, writes the channel number of the recording channel and the take number instructed by the CPU 101 into the track, and starts to record the sound (audio signal) in the recording channel into the track. Note that the recording of the recording channel is continued until an instruction to stop the recording is given (until an OFF operation of the recording or an operation of changing the recording channel or the selected take is performed). Further, the recorder 220 records the audio signal by overwriting new samples on old samples such that only the latest several tens of seconds is remained as the recorded data.

Next, at step S606, the CPU 101 determines whether or not reproduction is being performed. Here, the CPU 101 checks the reproduction flag and determines that reproduction is being performed when the reproduction flag is ON and determining that reproduction is stopped when the reproduction flag is OFF. If reproduction is stopped, the processing is ended. If reproduction is being performed, the CPU 101 performs steps S607 to S609 performed as processing when a reproduction channel is newly selected. First, at step S607, the CPU 101 specifies the newly selected channel as the reproduction channel. Note that the channel during reproduction is called a reproduction channel. In this embodiment, in the case where reproduction is being performed, the selected channel and the reproduction channel are the same channel at all times. The CPU 101 changes the switch module 211 of the reproduction channel to the reproduction state described in FIG. 5. At step S608, the CPU 101 specifies a selected take. Only one track is the reproduction target in one channel at a time. In this processing, one take is specified as the selected take (newly selected take). Specifically, the CPU 101 specifies the newly selected take referring to all recorded data in FIG. 3 which has been already recorded with the channel number of the reproduction channel, and specifies a recorded data with the latest take number among the data as a target to be reproduced in this embodiment.

Next, at step S609, the CPU 101 starts reproduction. Here, the CPU 101 instructs the recorder 220 to reproduce using a combination of the reproduction channel determined at step S607 and the selected take specified at step 608. Then, when accepting the instruction to start the reproduction, the recorder 220 extracts a track having information corresponding to the instructed combination of the reproduction channel and the selected take and, if it is found, starts to reproduce the audio signal recorded in the track. The recorder outputs the reproduced audio signal to the switch module 211 of the reproduction channel. By the instruction of the CPU 101, the switch module 211 of the reproduction channel is switched in the reproduction state described in FIG. 5, so that the switch module 211 passes the reproduced audio signal to the processor 212 of the reproduction channel. The passed audio signal is outputted after being processed in the processor 212. Note that if the recorder 220 cannot find the track corresponding to the instructed combination of the reproduction channel and the selection take, the recorder does not perform reproduction and the processing is ended. The reproduction of the reproduction channel is continued until an instruction to stop the reproduction is given (until an OFF operation of the reproduction or an operation of changing the reproduction channel or the selected take is performed). Further, the recorder 220 reproduces the audio signal of several tens of seconds recorded in the track being a reproduction target in repeating fashion.

Figure 7A:
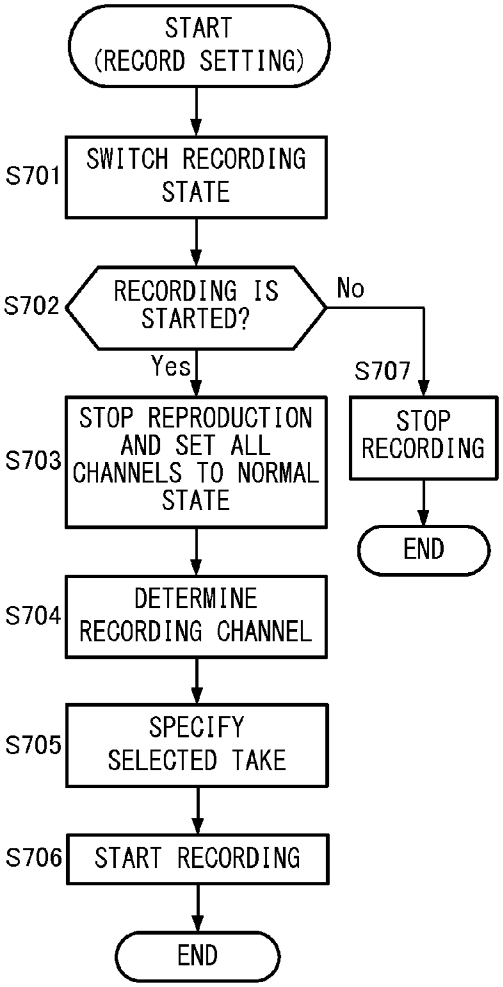
FIGS. 7A and 7B are flowcharts of record setting and reproduction setting.

FIG. 7A illustrates a flowchart of processing of record setting. The CPU 101 executes this processing when accepting an instruction to switch the recording state (to switch the recording flag), in other words, when accepting an instruction to start recording or stop recording. In this embodiment, this processing is activated when the recording switch 413 is depressed.

At step S701, the CPU 101 switches the recording state. The CPU 101 reverses the recording flag to OFF when it is ON, or to ON when it is OFF. Next, at step S702, the CPU 101 determines whether the recording flag is ON or OFF. When the recording flag is switched to OFF, the CPU 101 stops the recording at step S707. The CPU 101 cancels the recording channel (while not cancelling the channel selection) and instructs the recorder 220 to stop the recording of the track during recording. The recorder 220 accepts the instruction and stops the recording of the track during recording to thereby stop the recording operation. The CPU 101 switches the switch modules 211 of all of the channels to the normal state.

If the recording flag is switched to ON at step S702, the CPU 101 stops the reproduction and switches all of the channels to the normal state at step S703. In this embodiment, reproduction is inhibited during recording, and therefore if reproduction is being performed, the CPU 101 stops the reproduction operation and rewrite the reproduction flag into OFF. In addition, the CPU 101 switches the switch modules 211 of all of the channels to the normal state. At step S704, the CPU 101 determines the recording channel. In this embodiment, since the selected channel is to be determined as the recording channel, the CPU 101 extracts the current selected channel, and determines the extracted channel as the recording channel. The CPU 101 switches the switch module 211 of the recording channel to the recording state described in FIG. 5. The CPU 101 specifies the selected take at step S705, and starts recording at step S706. Steps S705 and S706 are the same processing as that at steps S604 and S605 in FIG. 6.

Figure 7B:
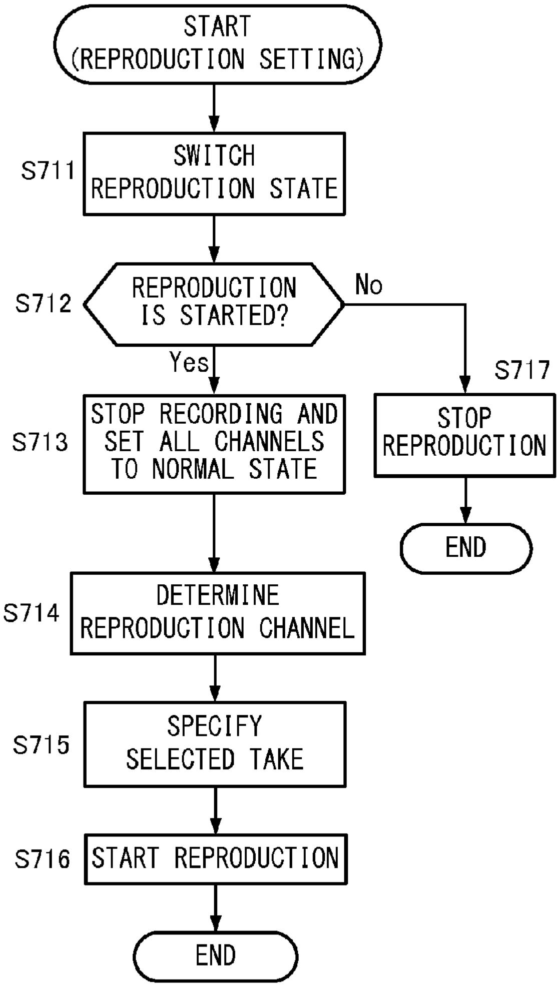

FIG. 7B illustrates a flowchart of processing of reproduction setting. The CPU 101 executes this processing when accepting an instruction to switch the reproduction state (to switch the reproduction flag), in other words, when accepting an instruction to start reproduction or stop reproduction. In this embodiment, this processing is activated when the reproduction switch 414 is depressed.

At step S711, the CPU 101 switches the reproduction state. The CPU 101 reverses the reproduction flag to OFF when it is ON, or to ON when it is OFF. Next, at step S712, the CPU 101 determines whether the reproduction flag is ON or OFF. When the reproduction flag is switched to OFF, the CPU 101 stops the reproduction at step S717. The CPU 101 cancels the reproduction channel (while not cancelling the channel selection) and instructing the recorder 220 to stop the reproduction of the track during reproduction. The recorder 220 accepts the instruction and stops the reproduction of the track during reproduction to thereby stop the reproduction operation. The CPU 101 switches the switch modules 211 of all of the channels to the normal state.

If the reproduction flag is switched to ON at step S712, the CPU 101 stops the recording and switches all of the channels to the normal state at step S713. In this embodiment, recording is inhibited during reproduction, and therefore if recording is being performed, the CPU 101 stops the recording operation and rewrites the recording flag into OFF. In addition, the CPU 101 switches the switch modules 211 of all of the channels to the normal state. At step S714, the CPU 101 determines the reproduction channel. In this embodiment, since the selected channel is set as the reproduction channel, the CPU 101 extracts the current selected channel, and determines the extracted channel as the reproduction channel. The CPU 101 switches the switch module 211 of the reproduction channel to the reproduction state described in FIG. 5. The CPU 101 specifies the selected take at step S715, and starts the reproduction at step S716. Steps S715 and S716 are the same processing as that at steps S608 and S609 in FIG. 6.

Figure 8A:
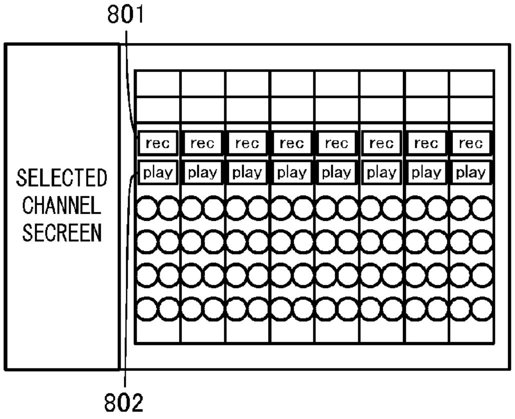
FIGS. 8A and 8B are diagrams illustrating a modified example.

Although the channel for recording or reproduction is selected by the SEL switch 411, and the instruction to record or reproduce is given by the recording switch 413 or the reproduction switch 414 in the above embodiment, any configuration may be employed as long as recording and reproduction can be instructed regarding each channel. For example, a rec switch 801 for instructing to record and a play switch 802 for instructing to reproduce may be provided for each channel as illustrated in FIG. 8A. In this case, it is conceivable that when any of the rec switches 801 is operated, the channel corresponding to the operated rec switch 801 is set as the recording channel and recording is started (or stopped), and when any of the play switches 802 is operated, the channel corresponding to the operated play switch 802 is set as the reproduction channel and reproduction is started (or stopped). Further, the above-described recording switch 413 and reproduction switch 414 can be eliminated. Further, in this case, it is conceivable that these switches 801, 802 are provided separately from the SEL switches. In other words, the selection of the selected channel by the SEL switch and the setting of the recording channel by the rec switch 801 or the setting of the reproduction channel by the play switch 802 may be independently performed.

Further, number of recording channels which can be set at the same time may be arbitrary. For example, when the selected channel is switched with the recording flag being ON, the previous recording channel is released and the newly selected channel is determined as the recording channel in the above embodiment. Instead, the previous recording channel may be maintained and the newly selected channel may be additionally determined as the recording channel. This also applies to the reproduction channel.

Furthermore, it is also adoptable that the recording channel and the reproduction channel exist at the same time so that the recording operation and the reproduction operation can be performed in parallel. This means that when the recording channel is determined, the reproduction state and the reproduction channel are not released, and when the reproduction channel is set, the recording state and the recording channel are not released.

Figure 8B:
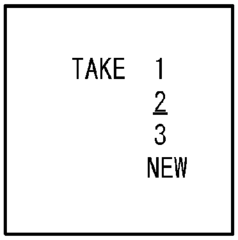

Recording is performed with a new take number added and reproduction is performed for data with the latest take number at step S604 in FIG. 6, step S608 in FIG. 6, step S705 in FIG. 7A, and step 715 in FIG. 7B in the above embodiment. However, it is not limited to the above embodiment if any one of takes can be specified as the selected take (method capable of specifying one selected take). For example, it is adoptable to allow a user to select a take number when instructing recording or reproduction. FIG. 8B illustrates an example of a screen for allowing a user to select a take number. It is conceivable that when a channel number is specified and an instruction to record or reproduce is made, the CPU 101 displays the screen as in FIG. 8B to allow the user to select for which take number of the specified channel the audio signal is to be recorded or reproduced. This selection may be configured such that a take is selected, for example, depending on number of times of depressing the SEL switch or a take is selected depending on number of times of depressing the recording switch or the reproduction switch. For example, when the same switch is operated plural times in a row, the second or later operation may be regarded as selection of a take and a take according to the number of times of depressing the switch may be specified as the selected take.

Though the recorder is an external recorder in the above embodiment, any recorder may be employed irrespective of the form of configuration, such as a recorder installed inside the digital mixer or a recorder installed outside. Further, the recorder may be fixed for each channel, but this configuration it is not necessary.

Though the channel number and the take number and the audio signal are recorded in one unit in the recorder as has been explained in FIG. 3 in the above embodiment, the "one unit" may be any form as long as the channel number and the take number and the audio signal are associated with one another. For example, it is adoptable that only the audio signal is recorded in the recorder, and the channel number and the take number are held on the mixer side such that the association of the channel number and the take number with the track is shown. It is also adoptable that when the audio signal is recorded in a file form in the recorder, its file name may include the channel number and the take number to show the association between them.

Though the digital mixer in which the invention is applied to the sound check system has been described in the above embodiment, the invention is also applicable to any situation of performing sound check.

According to the invention described above, sound check can be performed more rapidly, accurately and easily than before. Further, a memory for recording sample sounds can be efficiently used.

What is claimed is:

1. An audio signal processing system for recording a sound inputted into one of a plurality of channels of a mixer which receives a plurality of audio signals, processes the audio signals in the plurality of channels and outputs the processed signals, and reproducing the recorded sound for adjusting parameters of the mixer, comprising:

a record instructor that instructs to record;

a reproduction instructor that instructs to reproduce;

a channel selector that selects a channel among the plurality of channels as a target;

a recorder that, when the channel selector selects a first arbitrary channel among the plurality of channels while the record instructor is instructing to record, records an audio signal inputted to the selected first arbitrary channel of the mixer with relation information indicating the selected first arbitrary channel; and a reproducer that, when the channel selector selects a second arbitrary channel among the plurality of channels while the reproduction instructor is instructing to reproduce, reproduces an audio signal which has been stored with relation information indicating the selected second arbitrary channel, and sends the reproduced audio signal to the selected second arbitrary channel of the mixer.

2. The audio signal processing system according to claim 1, wherein the recorder records audio signals of a plurality of takes regarding one channel with take information indicating the take of the respective recorded audio signals.

3. The audio signal processing system according to claim 2, further comprising a take selector that selects a take to be reproduced, wherein the reproducer reproduces an audio signal of the selected take among the audio signals which has been stored with the relation information indicating the selected second arbitrary channel.

4. The audio signal processing system according to claim 1, wherein when the recorder records the audio signal inputted to the selected first arbitrary channel, the recorder newly reserves a track and records the audio signal into the reserved track.

5. A non-transitory computer readable storage medium that stores program instructions for instructing a processor of a mixer, which receives a plurality of audio signals, processes the audio signals in a plurality of channels and outputs the processed signals, to record a sound inputted into one of the plurality of channels of the mixer and reproduce the recorded sound for adjusting parameters of the mixer, the program instructions causing the processor to execute:

a step of accepting an instruction to record;

a step of accepting an instruction to reproduce;

a step of accepting selection of a channel among the plurality of channels as a target;

a step of, when the selection of a first arbitrary channel among the plurality of channels is accepted while the instruction to record is being accepted, recording an audio signal inputted to the selected first arbitrary channel of the mixer with relation information indicating the selected first arbitrary channel; and a step of, when the selection of a second arbitrary channel among the plurality of channels is accepted while the instruction to reproduce is being accepted, reproducing an audio signal which has been stored with relation information indicating the selected second arbitrary channel, and sending the reproduced audio signal to the selected second arbitrary channel of the mixer.

* * * * *